United States Patent Office 3,421,239
Patented Jan. 14, 1969

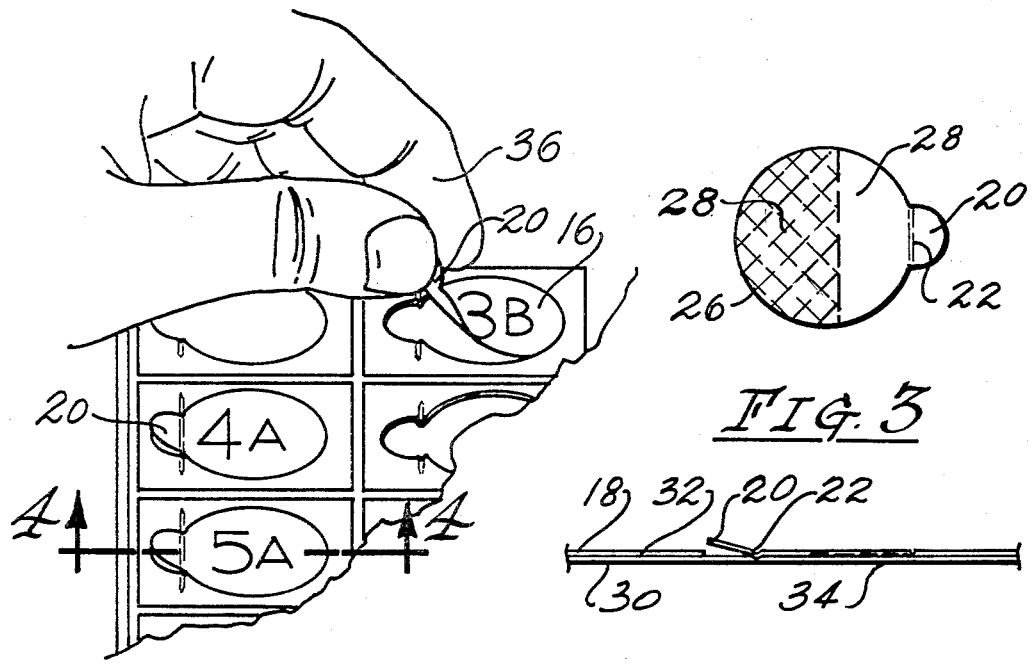
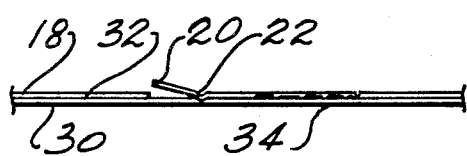
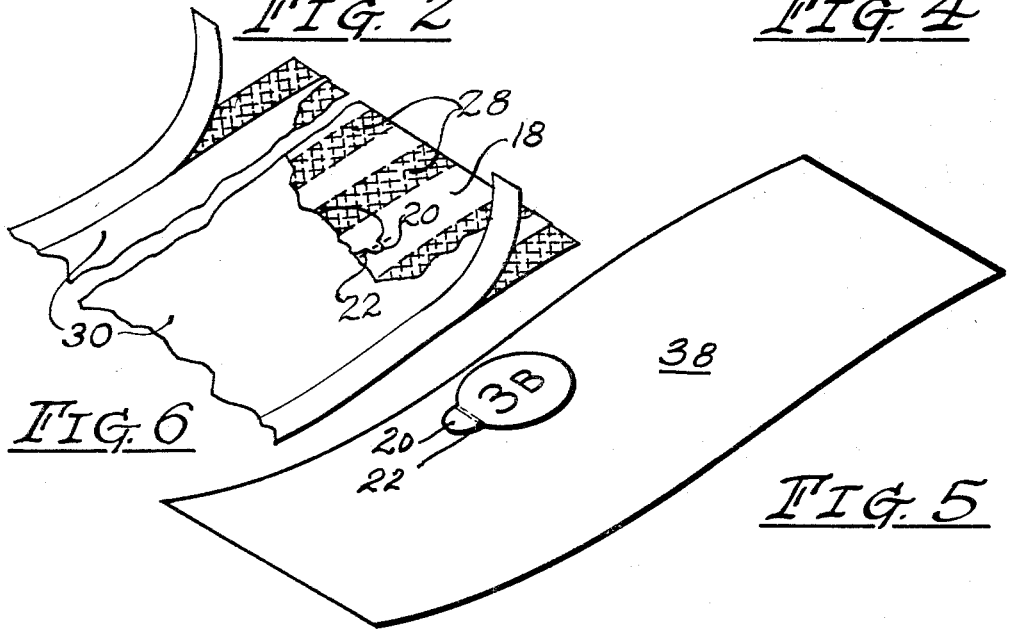

3,421,239
SELECTION APPARATUS AND METHOD
Jack L. Smith, 1356 Nerine Circle, De Kalb County, near
Dunwoody, Ga. 30043
Filed Nov. 2, 1965, Ser. No. 506,038
U.S. Cl. 40—19.5                    7 Claims
Int. Cl. G09f 3/18

ABSTRACT OF THE DISCLOSURE

One form of the present invention is an airline reservation schedule and seat selection sheet which is used one time for seat selection by passengers and from which individual seat markers are transferred to tickets or the like indicating on the device which seats are still available. The sheet is multi-ply with a back having a stick-resistant front and the sheet having a front with removable seat selection members removably stuck to the stick-resistant back with tabs on the selection members for easy removal.

---

While the present apparatus and method has particular application to the selection and reservation and indication of the status of seats on airlines, railroads and the like it will be apparent that within the scope of this invention there are other applications.

Generally described, without restriction on the scope of my invention as defined in the appended claims, the usual basis for the particular format would be the particular airplane seat arrangement or railroad or other seat arrangement according to the particular make of that airplane or railroad car. For example, certain jets made by different manufacturers have different seat arrangements and each of these seats may be shown on a master plan and indicated by a number the same as seats in a theater or any other location. It is already known in the art to use a permanent format showing a plan view or floor plan of a particular aircraft and setting up such a permanent board for each flight by placing markers thereon which are removed therefrom as the passengers select seats until the markers are depleted or until all of the passengers have obtained a seat. It then becomes necessary to replace the missing markers to set up the board for another flight and so on requiring time and attention of the flight attendants which is very difficult in view of the usual tremendous amount of traffic of passengers and the time involved. The present invention contemplates a disposable or one time floor plant format sheet of the particular aircraft and which will be used only for that particular flight and then may be filed, stored or destroyed. The present device is preferably made from paper or paper-like material which is printed in quantity. A top sheet of sufficient size and shape be readily visible from several feet, as for example, from behind the ticket counter to the passenger standing close thereto, has pre-printed thereon the floor plan or plan of the outline of the particular aircraft involved. This plan is marked into the plurality of individual seats clearly shown by heavy transverse printed lines preferably of different colors. According to the present method, the top floor plan sheet is also die-cut at each individual seat location to provide a circular member having a protruding tab thereon which, according to the present method is permanently adhesive on the back but temporarily stuck to a waxed or easily detached surface provided by the present method of production. In addition, the small tab on the circular member is scored so that it bends slightly from the plane of the floor plan sheet and sticks up slightly to be grasped readily by the flight attendant when he hurriedly removes this tab and its connected seat locater circular member and places it on the passenger's ticket. After the removal of the circular seat locater member, a plainly visible blank space is present indicating clearly that seat is no longer available. To provide the easily detachable adhesive circular member, the present invention is made from a plurality of superposed, composite sheets of paper-like material of which the main and top floor plan shape mentioned above is superposed and attached to and over at least one other sheet which provides a slick or waxey surface on one side against which the adhesive surface of the back of the front sheet is attached and superposed and then a nonadhesive and smooth surface which may be a heavy kraft paper or the like for the back of the entire device. In use, there will be a supply of these sheets readily available to the flight attendants each representing a particular aircraft, such as a DC-8. For a particular flight, the flight attendant in setting up a flight takes one of the composite sheets of the present invention and attaches it to the permanent board which identifies that flight number, departure time and so forth. Thereafter, it is a simple matter as each passenger steps up to the counter to remove the circular member corresponding to the seats selected by the passenger, to place it on the ticket or ticket container and then repeating this until the flight time is reached and the flight is complete. Upon completion of the seat selection, the present device may be removed and sent to the flight attendant at the departure gate, both to double check and to catch late arrivals, and thereafter may be destroyed or retained for a period of time according to preferences of the particular airlines and any regulatory agencies.

A primary object of this invention is to provide a disposable selection indicating device for individual selection of locations.

A further object of this invention is to provide a selection device having individual locations thereon comprising removable members each having a protruding portion defining an easily grasped location for the removal of the member.

Another object of this invention is to provide a disposable selection device for airline seat selection and the like consisting of a front sheet of printed floor plan having removable seat selection members thereon which are permanently adhesive on the back but separated by a slick surface whereby such members are easily removed and the entire arrangement is inexpensively constructed from printed, superposed paper-like material.

Still another object of the present invention is to provide a selection device for selecting seats on airlines or the like which provides a printed floor plan having seat locations thereon defined by gummed or adhesive stickers which are die-cut into the floor plan sheet and defined in such a manner as to be easily removed therefrom.

Other and further objects and advantages of my invention will become apparent upon reading the following specification taken in conjunction with the accompanying drawings, in which:

FIG. 2 is a perspective view of a portion of the device shown in FIG. 1 and illustrating the removal of one of the seat selection members.

FIG. 3 is a bottom plan view of one of the seat selection members shown in FIGS. 1 and 2 and illustrating the adhesive on the back.

FIG. 4 is a cross-sectional view taken along lines 4—4 in FIG. 2.

FIG. 5 is a perspective view of a diagrammatic ticket showing the seat selection member of FIG. 2 permanently placed thereon.

FIG. 6 is a perspective view of the back of the device showing the removable, adhesive-held strips.

Figure 1:
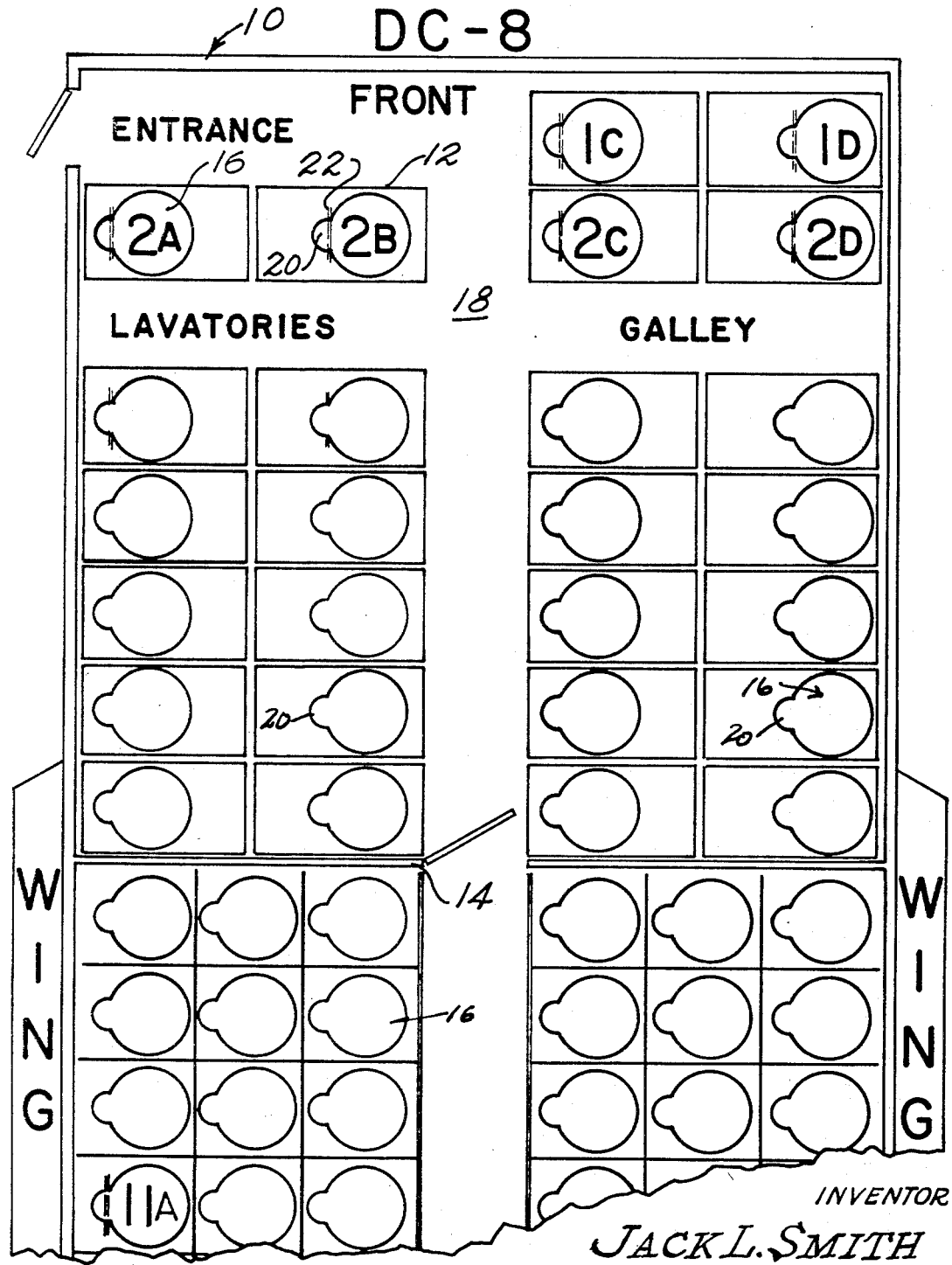
FIG. 1 is a plan view of a portion of the floor plan top sheet of the present invention.

It is to be noted that the present apparatus and method relates to a disposable selection device, that is, one which is used for only one flight each time and a new one is used each time a new flight is set up and completed. It is replace permanent bulletin boards, painted boards, with removable tags, plastic cards or the like and other permanent devices. The present invention is manufactured from paper or paper-like material in sheet form, completely flexible, and adapted to be tacked or clamped otherwise secured to a board and also easily stored before use in stacks of packages of identical devices. In addition, the floor plan or main sheet or front sheet of the present device and which is the only one which is really exhibited to the passengers is printed in quantity and, if desired, in multicolors so that the seats, the passageways, the lavatories, the galley, the entrances and exists, the wings and other pertinent things stand out readily when viewed.

A portion of the main or front panel or sheet, sometimes herein refered as the floor plan, is designated in FIG. 1 generally and overall by the reference number 10 and in the particular illustration used is for an actual DC–8 aricraft. All of the indicated items, such as wings, entrance, front, galley and the like are shown merely by printing, unless otherwise stated herein, as are the individual boxes 12 defining seat locations, the wall 14 separating the different classes of flight. A typical complete arrangement 10 would be something like 14 inches in width and some three feet in length, having seat locations 12 marked for 26 first class seats forward and some 111 other seats aft arranged three on each side aft and two on each side forward. Although in the present specification, all of the seats are not shown in FIG. 1 nor are all of the seats numbered, it is apparent that starting with the forward seats, seats on the right hand side forward are designated seats 1C and seats 1D, immediately therebehind 2C and 2D and on the left hand or port side 2A and 2B and so on on each side of the aircraft and from the front to the rear. Therefore, each seat location 12 carries only one specific designation and in this present arrangement it is shown on a removable circular member 16 having the particular seat location and designation, such as 1C, printed thereon. For easy viewing the forward seats can be colored and the blocks 12 solid color, for example blue or red whereas the seats behind the wall 14 arranged three in a row may be designated by some other color. Insofar as the present invention is concerned, each of the removable circular members 16 is constructed identically regardless of the size of the seat or category.

The entire front sheet or panel on number 10 is designated by reference numeral 18 and is made from a heavy enameled paper or paper-like material. In the printing process, a die is brought into engagement with the sheets to cut and define each of the circular members 16 and each of which is provided with a protruding tab 20 formed intregally with the circular member 16 and protruding therefrom. In the die-cutting operation, a protruding scoring member scores along a line 22 which is transverse of the tab 20, and substantially tangential to the circumference of the circular member 16, not cutting but indenting across line 22 which causes the small tab 20 to assume an inclination with respect to the plane of the sheet 18 in the manner shown substantially in FIG. 2.

The back of sheet 18 is provided in production and repetively each sheet with a permanent tacky adhesive or gummed material, which is common and well known in the printing industry, and in a particular pattern that is shown in FIG. 3 as covering a substantial portion of each of the removable circular members 16 as shown by reference numeral 26 and leaving free and clear of any adhesive 28 which includes the back side of the uplifted tab 20.

As seen in FIG. 4, the entire back of sheet 18, which contains some gum substance shown and represented by the portion 26 in FIG. 3, is protected and covered by means of a backing sheet, in the present embodiment being one sheet 30 which has on the surface next to sheet 18 against which it is superposed, a waxy or slick surface 32 which does not stick to the gummed adhesive material. The back surface of sheet 30 designated by reference numeral 34 may be of a heavy kraft paper providing strength and protection.

To make the device 10, the gummed surface 26 may be applied in a gum applicator against the back of sheet 18 and then sheet 30 is superposed on the back of sheet 18. At the same time a vertical slit 39 is cut in the backing 30 thereby dividing backing 30 into 3 parts 30A, 30 and 30B, all three parts still completely glued to sheet 18. As mentioned previously, the waxy surface may be provided in the form of a sheet or film 32 to the front of sheet 30 or preferably is part of one side 32 of a sheet 30 forming the backing material which also has the back surface 34. The method of producing the present composite comprises printing the printed material on the front of sheet 18, die cutting to form the removable die-cut circular member 16, and scoring across line 22, thereby completing the sheet 18.

Each tab 20 sticks up or protrudes from the surface of sheet 18 from the score line 22 and as shown in FIG. 4 may easily be grasped by the fingers 36, of an airline representative such as a ticket counter person, and then thereafter stuck to a typical envelope or ticket number 38 shown diagrammatically in FIG. 5 by means of the tacky or the adhesive surface 26 which adheres to the ordinary surface of the member 38. Referring to FIG. 1, once the location 3B is removed from the floor plan sheet 18, this space shows in the form of a blank space such as the blank space as indicated in FIG. 1. Therefore, when a passenger steps up to the counter to select his seat, he recognizes immediately all of the seats which are unavailable and these seats do not have any numbers showing and the only numbers which are showing are those on the circular members 16 still remaining. Thus, the passenger readily selects one of the remaining seats and communicates this to the airline representative who removes the tab 16 and attaches it to the passenger's ticket.

It is to be noted that there is nothing for the airline representative to prepare in the way of seat location indicators as in the case of previous devices. The airline personnel merely selects one of the fresh devices 10 and attaches it to the permanent holder on the board which represents their particular flight. The unused device 10 is attached to the board by means of removing the ½ inch strips 30A and 30B running vertically the 34 inches way on each side from sheet 18, which leaves the exposed glue-adhesive 26. This adhesive then holds the device against the permanent board. Thereafter, upon completion of the selection of seats, the airline personnel removes the entire device 10 and forwards it to the departure gate with the manifest and it may again be used at that gate for late arrivals and for double checking and so forth.

Since the present seat selection devices 10 are used in considerable quantities by airlines for numerous flights departing from many locations each day, the present device may be printed in quantity thereby making the ultimate cost very reasonable and this inexpensive cost is offset by the time saved as well as the good public relations resulting from fast service and more efficient display and selection by the passengers. Furthermore, if a passenger changes his mind, he may return to the ticket counter and select another seat location and the alteration is a simple procedure of replacing the tab which has been removed or of notating on that blank that it is available again.

While I have shown and described a particular embodiment of my invention, together with suggest construction and operation thereof, this is by way of illustration only to the extent that it does not constitute any sort of limitation on the invention since various alterations, changes, deviations, eliminations, ramifications, substitutions, revisions and elucidations may be made in the embodiment shown and described departing from the scope of my invention as defined in the appended claims.

It is also to be noted that I have shown and described the present invention as a seat selection system for transportation, it is easily applied to many other situations, for example, the floor plan may be that of a theatre or restaurant and the seat locations may represent seats, tables or could even represent people and places they are to assume for a given situation.

I claim:
1. In a selection device for selecting a location shown on the device from a plurality of locations thereon:
   (a) a multi-ply plan member sheet having a plurality of individual locations indicated thereon, said seats having a diagram indicated thereon representing something to which said locations relate such as the individual seats on an airliner,
   (b) a removable location member on each of the locations and being temporarily retained in place by sticking means thereon, said member having said sticking means thereon for subsequent and separate attachment at some other location such as the passenger's ticket,
   (c) each of said removable members indicated with identification for that particular location, and each of said members being defined by cutting through said plan sheet,
   (d) each of said members having a tab thereon which extends away from the plane of the plan sheet to be easily grasped to remove the tab and member therefrom,
   (e) said multi-ply plan member comprising a back with a stick-resistant surface and a front having said seat location removable members as a part thereof, and each removable member having a sticking means on at least a part thereof.

2. The device in claim 1 wherein said sheet is die-cut to provide all of said locations simultaneously, and the back of said sheet is provided with the adhesive in a pattern which provides adhesive on at least a portion of each of said removable members.

3. The device in claim 2, wherein said cover is a backing member on which said plan sheet is superposed to cover all of the adhesive, whereby with said cover removed said plan member may be attached on a surface such as an airline selection board.

4. The device in claim 2 wherein said sheet is multi-ply and the back of said sheet is provided with an adhesive substance in a pattern of spaced strips extending the length of the sheet which provides adhesive on at least a portion of each of said removable members, 5. The device in claim 4, wherein said back covers, said adhesive and having removable longitudinal strips, there being one adjacent respective side to be removed for attaching the device to a surface such an an airline reservation board.

6. The device in claim 4, wherein the adhesive is on at least a portion of each removable member and the cover on the back is provided with a wax-like coating at the adhesive portion of each member.

7. The device in claim 1 wherein said tab is caused to extend from the plane of said plan sheet by a score line which extends across said tab between said tab and said circular member, and said tab is free of adhesive on a part thereof.

References Cited
UNITED STATES PATENTS

| | | | |
|---|---|---|---|
| 228,204 | 6/1880 | Lemon | 283—1 X |
| 1,368,776 | 2/1921 | Wander | 283—23 |
| 1,881,650 | 10/1932 | Judd | 40—124 |
| 2,213,666 | 9/1940 | Burke | 40—125 X |

EUGENE R. CAPOZIO, Primary Examiner.

WENCESLAO J. CONTRERAS, Assistant Examiner.

U.S. Cl. X.R.

40—63